(12) United States Patent
Webb

(10) Patent No.: US 10,932,508 B2
(45) Date of Patent: Mar. 2, 2021

(54) METHOD OF MAKING AN ARTIFICIAL TREE

(71) Applicant: Terry K. Webb, Tarboro, NC (US)

(72) Inventor: Terry K. Webb, Tarboro, NC (US)

(\*) Notice: Subject to any disclaimer, the term of this patent is extended or adjusted under 35 U.S.C. 154(b) by 324 days.

(21) Appl. No.: 15/951,729

(22) Filed: Apr. 12, 2018

(65) Prior Publication Data

US 2019/0313723 A1 Oct. 17, 2019

(51) Int. Cl.
| | | |
|---|---|---|
| *A41G 1/00* | (2006.01) | |
| *B29C 44/12* | (2006.01) | |
| *B29K 705/02* | (2006.01) | |
| *B29K 105/04* | (2006.01) | |
| *B29L 31/00* | (2006.01) | |
| *B29K 25/00* | (2006.01) | |

(52) U.S. Cl.
CPC .......... *A41G 1/007* (2013.01); *B29C 44/1209* (2013.01); *B29C 44/1271* (2013.01); *B29K 2025/06* (2013.01); *B29K 2105/04* (2013.01); *B29K 2705/02* (2013.01); *B29L 2031/7026* (2013.01)

(58) Field of Classification Search
CPC ................................................ B29C 44/1209
USPC ........................................................... 428/18
See application file for complete search history.

(56) References Cited

U.S. PATENT DOCUMENTS

| | | | |
|---|---|---|---|
| 5,316,807 A | 5/1994 | Hill | |
| 6,117,503 A | 9/2000 | Lee | |
| 6,599,591 B1 | 7/2003 | Scott | |
| 2005/0181688 A1* | 8/2005 | Roberts | ................... B63B 34/00 441/36 |

FOREIGN PATENT DOCUMENTS

| | | |
|---|---|---|
| KR | 2003-0077056 | 10/2003 |
| KR | 10-1216281 | 12/2012 |

OTHER PUBLICATIONS

Search Report and Written Opinion from a corresponding application No. PCT/US19/21623 dated May 30, 2019.

\* cited by examiner

*Primary Examiner* — Brent T O'Hern
(74) *Attorney, Agent, or Firm* — James G. Passé; Passé Intellectual Property, LLC

(57) ABSTRACT

The present invention is an artificial tree consisting of a shape such as conical wherein there is an artificial outer layer, e.g. artificial grass, a solidified foam core, and a post molded into the foam core.

3 Claims, 6 Drawing Sheets

METHOD OF MAKING AN ARTIFICIAL TREE

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to an artificial tree. In particular, the invention relates to a solid core artificial tree and the method of making the tree.

Description of Related Art

The making and use of artificial trees, including plants and bushes, has been widely used. Most people are familiar with artificial Christmas trees which require assembly and disassembly. The quality of such trees varies wildly and they are known for having a short life spans due to their fragile nature even though they are normally only intended for indoor use.

Molded plants and flowers are readily available to construct one's own artificial plant. They offer beauty without the perishable nature of artificial plants. There is everything from small plants to large trees, such as palm trees. In general, these too are really only suitable for indoor use and easily come apart during use. Some methods of making sturdier trees are known. More durable outdoor trees tend to be made of heavy metal framing, need injection molding equipment, and take an extensive amount of labor to construct. They are also very expensive to make and costly to install for their intended use. Many designs also require a sub frame to hold the shape of the tree. Accordingly, the use of artificial trees outdoors is limited if non-existent.

BRIEF SUMMARY OF THE INVENTION

The present invention relates to an artificial tree having a lightweight curable core, rigid tube, and a flexible material outer layer and overcomes the above problems and limitations with artificial trees. In addition, it is a much cheaper process to produce each tree than prior methods and produces a tree with outstanding outdoor weather resistance.

Accordingly, in one embodiment, there is an artificial tree comprising:
a) a flexible outer layer in a predetermined shape;
b) a solidified expanded foam core;
c) a rigid tube or post molded into the solidified foam core; and
d) wherein the woven outer layer is fused to the solidified expanded foam core.

In another embodiment, there is a method of making an artificial tree comprising:
a) cutting and joining a woven outer layer into a predetermined shape;
b) placing the cut and joined woven outer layer inside a mold for the predetermined shape;
c) adding uncured foam designed for solidification expansion to an inside of the woven outer layer;
d) positioning a ridged post or tube centered in the uncured foam and holding it in place;
e) curing the uncured foam to create a solidified expanded foam core with a post or tube sticking out the bottom; and
f) removing the artificial tree from the mold.

DETAILED DESCRIPTION OF THE INVENTION

Figure 1:
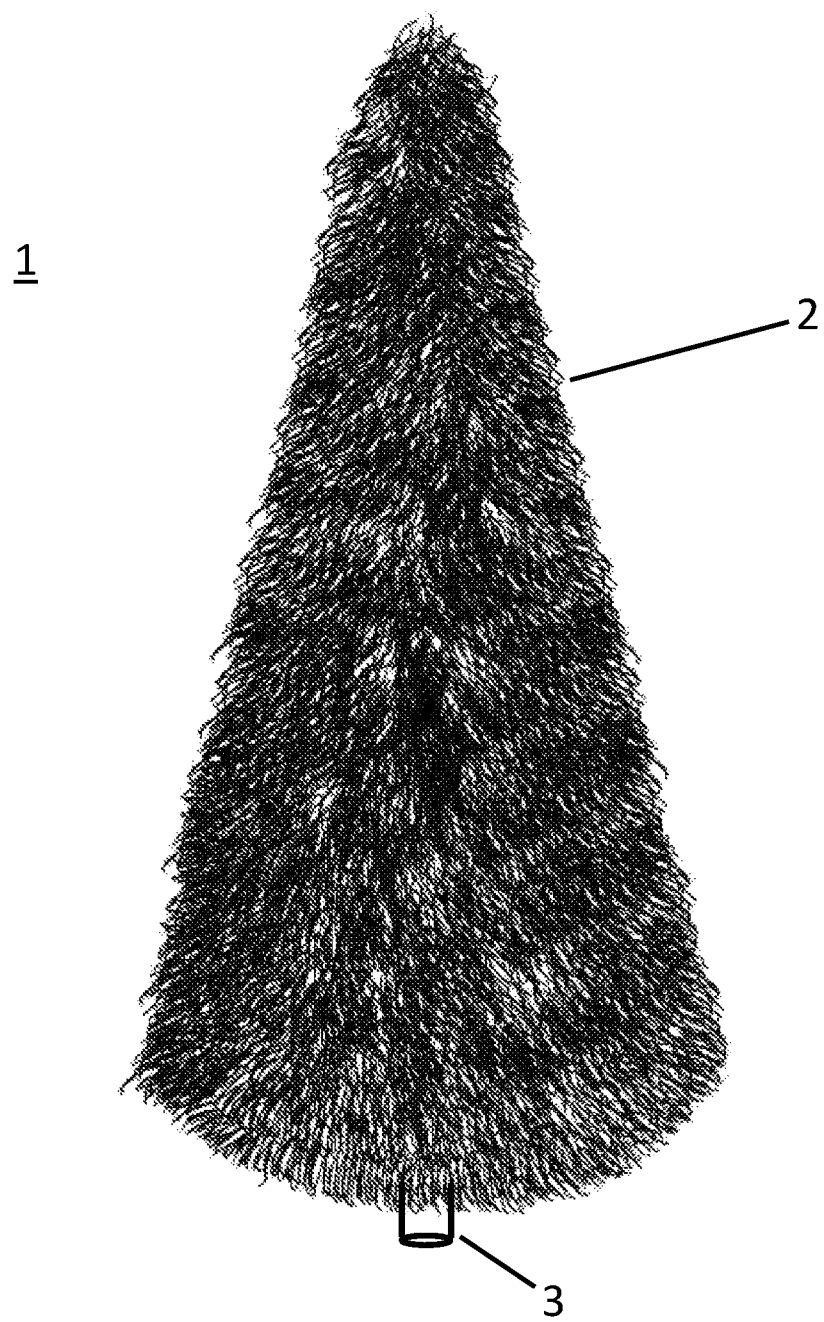
FIG. 1 is a perspective view of the artificial tree.

While this invention is susceptible to embodiment in many different forms, there is shown in the drawings, and will herein be described in detail, specific embodiments with the understanding that the present disclosure of such embodiments is to be considered as an example of the principles and not intended to limit the invention to the specific embodiments shown and described. In the description below, like reference numerals are used to describe the same, similar, or corresponding parts in the several views of the drawings. This detailed description defines the meaning of the terms used herein and specifically describes embodiments in order for those skilled in the art to practice the invention.

Definitions

The terms "about" and "essentially" mean±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term "comprising" could be separated into one or more claims using "consisting" or "consisting of" claim language and is so intended.

Reference throughout this document to "one embodiment", "certain embodiments", "an embodiment", or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B, or C" means any of the following: "A; B; C; A and B; A and C; B and C; A, B, and C". An exception to this definition will occur only when a combination of elements, functions, steps, or acts are in some way inherently mutually exclusive.

The drawings featured in the figures are for the purpose of illustrating certain convenient embodiments of the present invention, and are not to be considered as limitation thereto. The term "means" preceding a present participle of an operation indicates a desired function for which there is one or more embodiments, i.e., one or more methods, devices, or apparatuses for achieving the desired function, and that one skilled in the art could select from these or their equivalent in view of the disclosure herein, and use of the term "means" is not intended to be limiting.

As used herein, the term "artificial tree" refers to a constructed object made of synthetic and artificial materials, designed to resemble a real tree, bush, or the like. The tree can be most any predetermined shape including globe, conical, and the like. In one embodiment, all the materials are synthetic. It is made of three parts: the outer layer, the solidified foam core, and the center post or tube. There are no fragile parts, lose pieces, or open cavities in which insects or animals could nest or inhabit.

As used herein, the term "flexible outer layer" refers to material for the outside of the artificial tree which is made in flexible sheets. As an example, artificial grass comes in a flexible woven mat that resembles growing foliage. One advantage of polymeric woven mats is their resistance to weather which means such a tree will have a long life in the outdoors.

As used herein, the term "solidified expanded foam core" refers to polymeric material which upon curing, e.g. by heat radiation or the like, solidifies. One common material is expanded polystyrene. Others include polyurethane expanding foam open and closed cell, cross-linked PVC foam, thermoplastic foam, syntactic foam, linear PVC foam, polymethacrylimide foam, and the like.

As used herein, the term "rigid tube or post" refers to a rigid member positioned in the center of the foam core such that it appears and acts like the trunk of a real tree. See especially FIG. 1. In one embodiment, it is a metal tube such as aluminum or other metal. In another embodiment, it is a wood or metal post. The chosen tube or post must be sufficiently strong to hold the tree upright. The tube or post can then be stuck in the ground, put on a post that is in the ground, or any other means for planting the artificial tree outside. In one embodiment, it is a 2 inch diameter aluminum metal tube.

As used herein, the term "fused" refers to the uncured foam core being positioned inside the shaped outer layer. Upon curing to its solidified form, the foam will bond the outer layer as well as hold the tube or post in a fused/attached manner.

As used herein, the term "predetermined shape" refers to the final shape that the artificial tree will take. In the Figures is shown a conical shape but other shapes are contemplated including more global and cubed, cylindrical, trapezoidal, and the like.

As used herein, the term "woven bottom layer" refers to the fact the tree can just have the solidified foam core only covered on the sides by the outer layer, but in this embodiment, a piece of woven material is attached to the bottom of the foam core either during curing or after curing as a separate piece.

As used herein, the term "mold" refers to a device on which the outer layer can be placed and support the shape for filling with the foam core. In one example seen in the figures, a conical shaped outer layer of artificial grass is placed inverted into a conical mold. The polymeric expandable foam can then be poured into the open portion of the outer layer.

As used herein, the term "jig" refers to a device for holding the tube or post in place while the foam core is cured and solidifies. See the Figures for examples. One of skill in the art could propose other jigs in view of the disclosure herein.

As used herein, the term "cutting and joining" refers to taking one or more pieces of material and cutting it to a shape which can be joined to form the predetermined shape. The Figures show the pieces for a conical tree.

Drawings

Now referring to the drawings, FIG. 1 is the artificial tree of the invention 1. The tree has an outer layer 2 which, in the example, is artificial grass, but could be any flexible material having the general appearance of a tree or bush. It is held in its conical shape by a solidified foam core which holds tube 3 in place for planting the tree.

Figure 2:
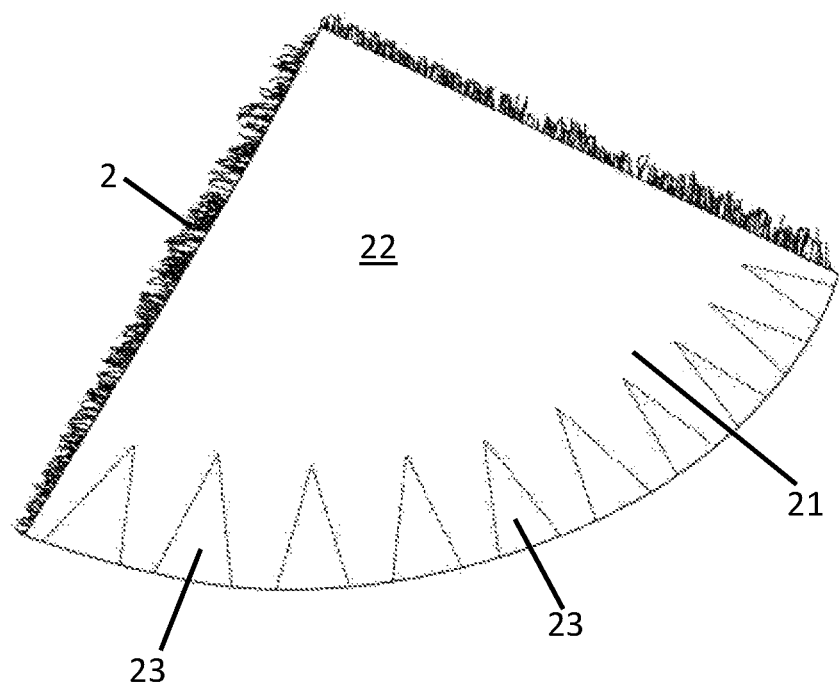
FIG. 2 is an inside view of the flexible outer layer before shaping.

FIG. 2 shows a piece of material 21 from the inside 22 which has multiple pieces cut out 23 such that, when the fabric is sewn together, it forms the predetermined shape, i.e., in this case, conical. The particular cut shown allows for forming a round bottom.

Figure 3:
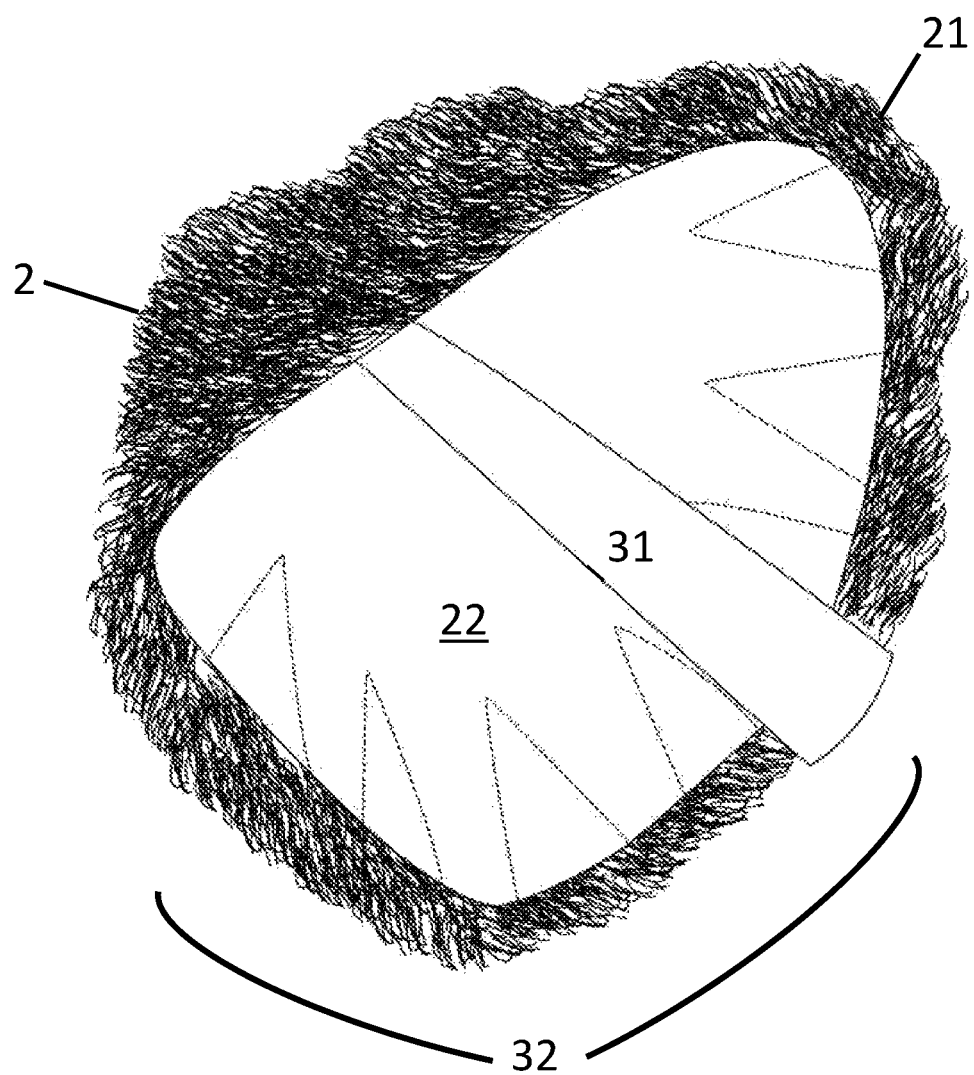
FIG. 3 is an inside perspective view of the outer layer formed into a desired conical shape.

FIG. 3 shows the material 21 which has been joined together to form the conical shape 32 desired. Tape 31 is shown joining the seams to make the conical shape. Any method of joining can be used including, but not limited to, seam tape, sewing, hot melt, and thermal fusion.

Figure 4:
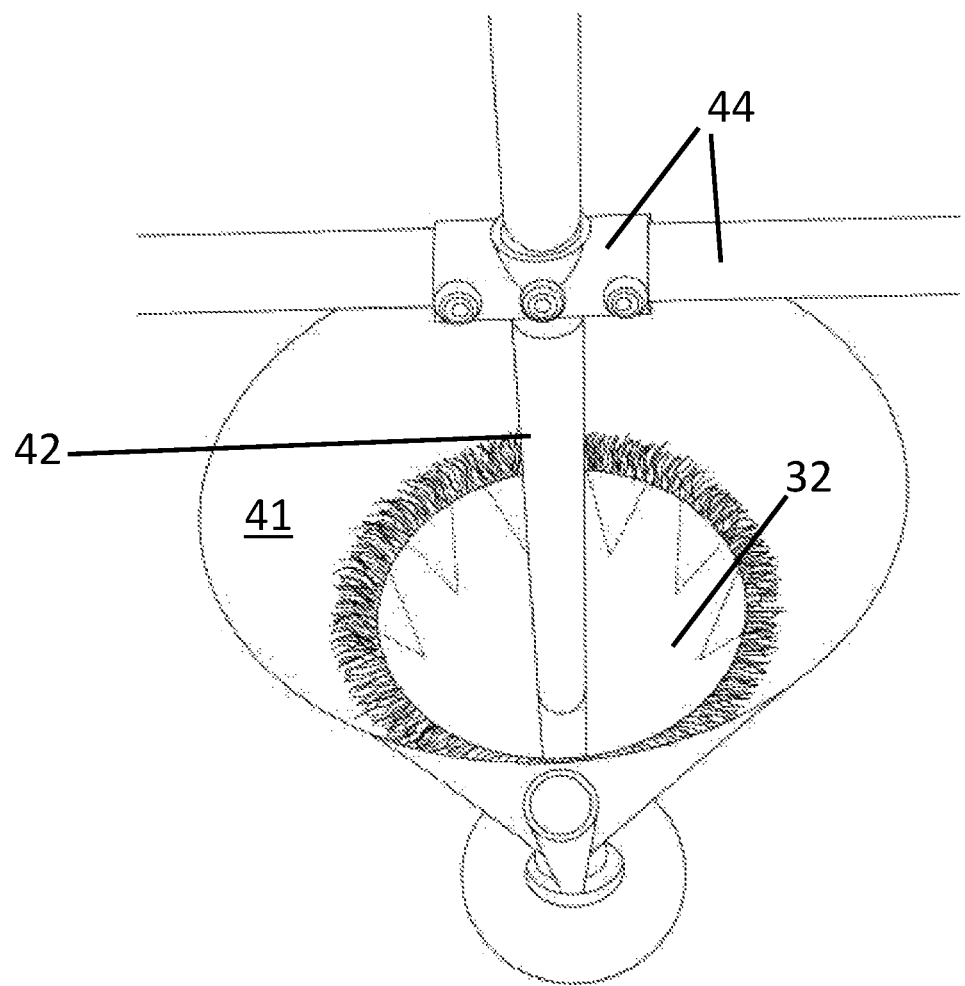
FIG. 4 is a perspective view of the formed outer layer positioned in a mold with a jig holding the center tube awaiting expanded foam.

FIG. 4 shows the conical shaped material 32 is placed in conical mold 41 which holds it open for addition of the uncured foam core. Also shown is aluminum tube 42 positioned in the middle of the shaped material 32. The aluminum tube 42 is held in place with jig 44 which holds the tube 42 vertically while the core solidifies.

Figure 5:
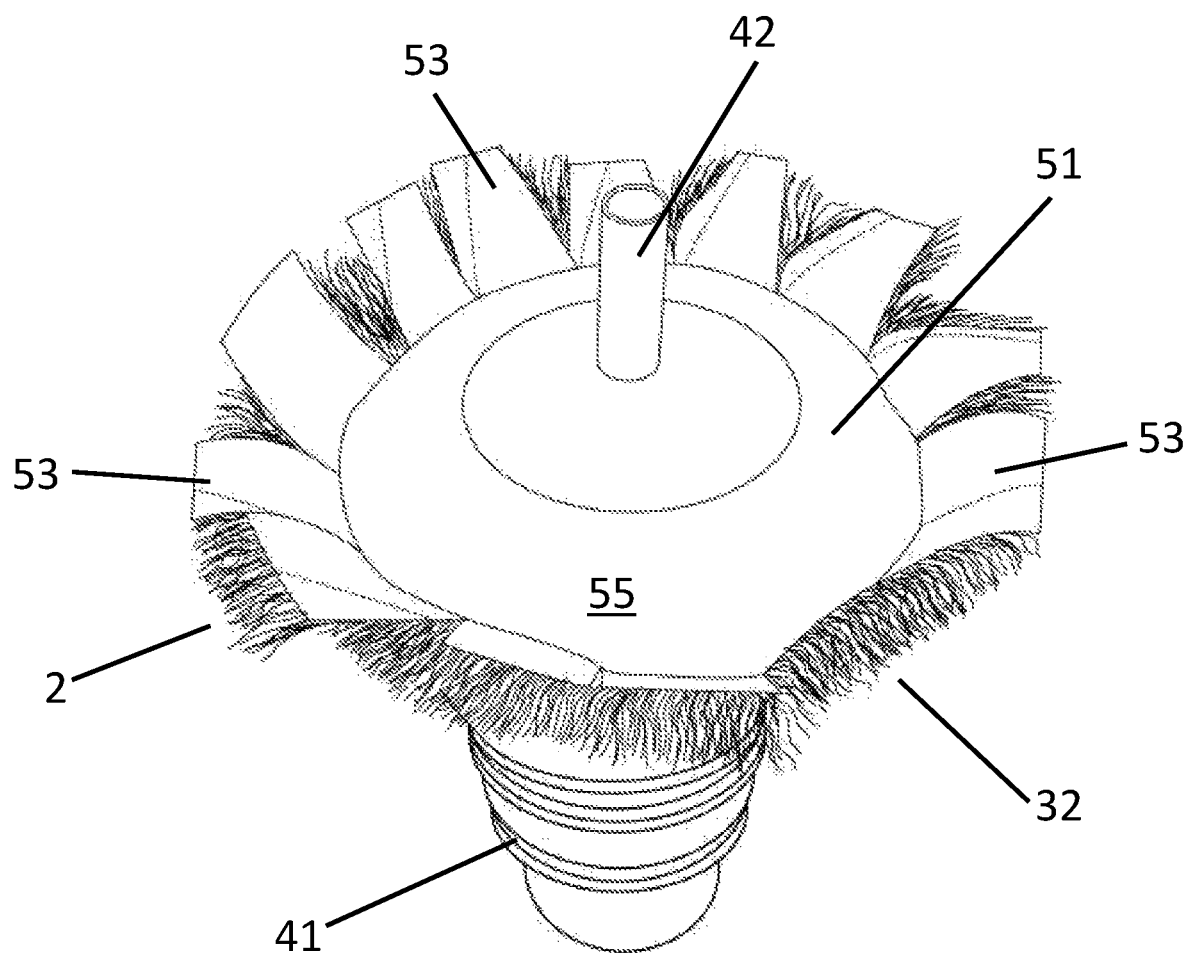
FIG. 5 is a perspective view of the solidified core with the tube jig removed.

FIG. 5 shows the solidified expanded foam core 51 has been formed buy placement of the uncured foam and then curing it. The flaps 53 can be folded and glued over the top 55 of the foam.

Figure 6:
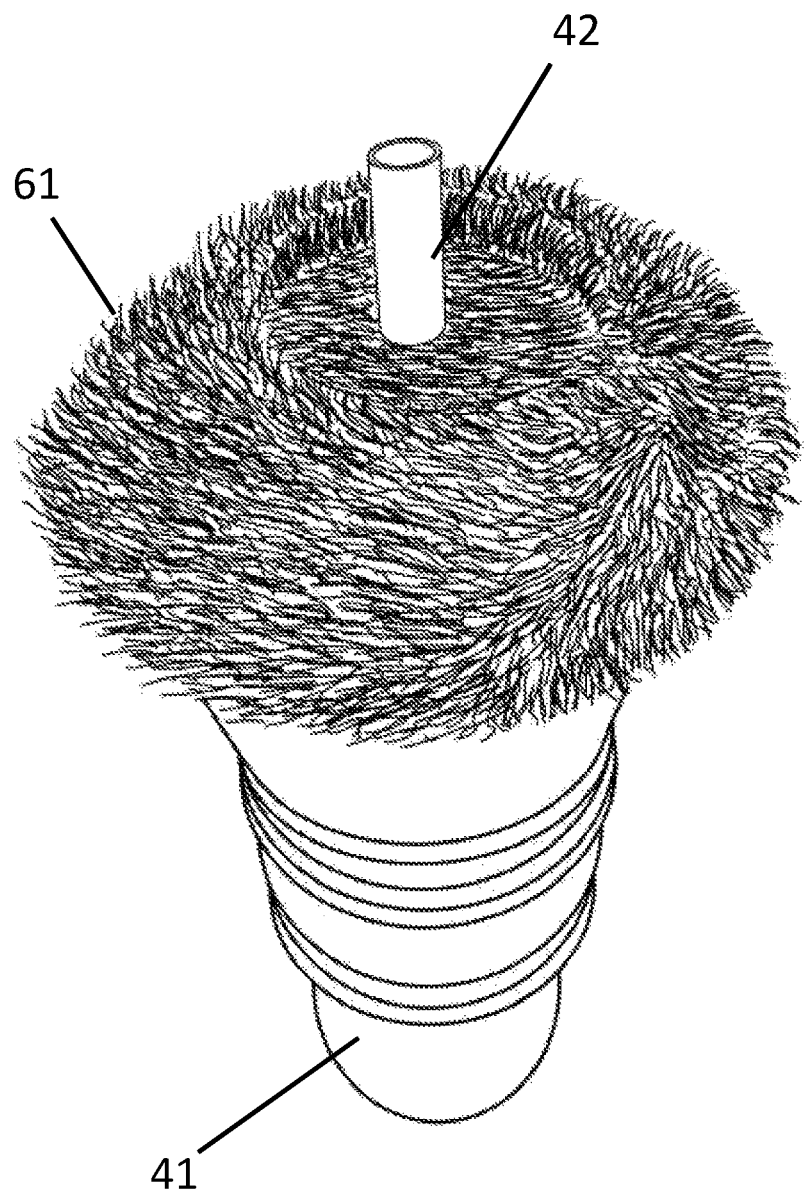
FIG. 6 is a view of additional bottom layer added to the tree.

FIG. 6 shows either tabs 53 folded over to achieve a covered bottom 61. In the alternative, this could represent a separate piece of material glued to the foam core. Upon removal, one gets the artificial tree of FIG. 1.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials, and the like apparent to those skilled in the art still fall within the scope of the invention as claimed by the applicant.

What is claimed is:

1. A method of making an artificial tree comprising:
   a) cutting and joining a woven outer layer into a predetermined shape;

b) placing a cut and joined woven outer layer inside a tube or post sufficiently strong to hold the tree upright;
c) adding uncured foam designed for solidification expansion to an inside of the woven outer layer;
d) positioning the post or tube centered in the uncured foam and holding it in place;
e) curing the uncured foam to create a solidified expanded foam core with the post or tube sticking out a bottom; and
f) removing the artificial tree from the mold.

2. The method of making the artificial tree according to claim 1 wherein a piece of woven outer layer material is positioned on a top of the solidified expanded foam core.

3. The method of making the artificial tree according to claim 1 wherein the post or tube is positioned using a jig which holds the rigid post or tube in place during curing of the foam.

* * * * *